June 6, 1961 W. O. ANDREWS 2,987,285
PORTABLE HANDLE HANGER
Filed Oct. 1, 1959

INVENTOR.

William O. Andrews

United States Patent Office 2,987,285
Patented June 6, 1961

2,987,285
PORTABLE HANDLE HANGER
William O. Andrews, San Diego, Calif.
Filed Oct. 1, 1959, Ser. No. 843,778
3 Claims. (Cl. 248—113)

This invention relates to hangers and more particularly to a device for suspending implements by the shaft handles thereof.

It is an object of the present invention to provide a portable handle hanger which can be conveniently moved from place to place and which can be used to releasably support a shaft type handle of any implement in a simple and convenient manner.

Another object of the present invention is to provide a handle hanger of the above type in which the handle is frictionally secured without damage to the surface thereof, and which may effectively release the handle for use in a convenient manner without extensive manipulation of the working parts.

Other objects of the invention are to provide a handle hanger bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
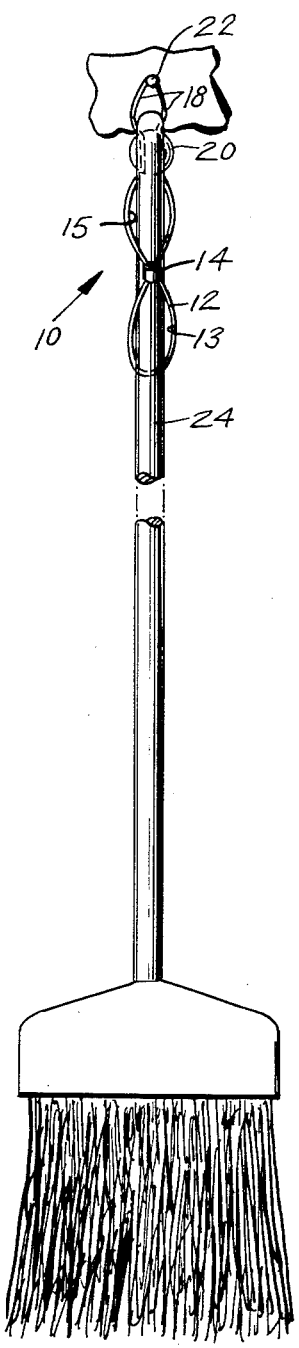
FIGURE 1 is a front view of a handle hanger made in accordance with the present invention in actual use.
Figure 2:
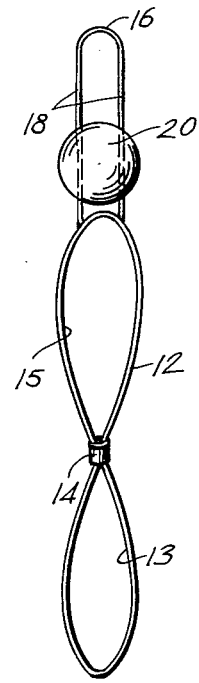
FIGURE 2 is an enlarged front plan view of the hanger device made in accordance with the present invention.
Figure 3:
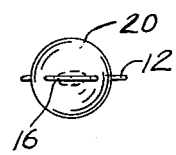
FIGURE 3 is a top plan view of the assembly shown in FIGURE 2.

Referring now more in detail to the drawing, a handle hanger assembly 10 made in accordance with the present invention is shown to include a substantially annular loop member 12 contracted at substantially the center thereof by means of a ferrule 14, so as to define a first lower loop 13 and a second upper loop 15, both of which loops lie in a substantially common plane.

An inverted U-shaped suspension device 16, having a pair of spaced apart parallel sides 18, is secured to the portions of the loop 12 defining the upper loop portion 15. The sides 18 of the suspension device slidably extend through a spherical member 20 which is preferably constructed from compressible material, such as sponge rubber.

In actual use, the suspension 16 may be readily supported upon any element, such as a nail or screw 22. The shaft type handle 24 of any implement to be supported is then moved first through the lower loop 13 and then through the upper loop 15 of the contracted loop member 12, with the ferrule 14 overlying one side of the handle 24 and an opposite side of the handle being frictionally engaged with the spherical abutment member 20. Because of the oppositely acting forces on the diametrically opposite sides of the handle 24, the ferrule 14 and spherical ball member 20 serve to retain the handle within the lower and upper loop portions 13, 15, until manually released.

It will now be recognized that this assembly may be readily hung upon any vertical member, simply by placing the suspension device 16 upon the nail or screw, and thus enabling it to be used to support the implement having a handle at a selected height.

While various changes may be made in the detail construction, it shall be understood that such changes shall be within the spirit and scope of the present invention as defined by the appended claims.

What I claim as new and desire to protect by Letters Patent of the United States is:

1. A portable implement support comprising, in combination, a main frame member defining a pair of closed loops, both of said loops lying in a generally common plane, a ferrule intermediate and common to both of said loops, a hanger carried by one of said loops, an abutment carried by said hanger, an implement shaft being receivable through both of said loops with said ferrule engaging one side of said shaft and said abutment frictionally engaging a diametrically opposite side of said shaft, said main frame comprising an annular band contracted on substantially diametrically opposite sides, said ferrule being carried by said contracted portions of said band, said hanger comprising an inverted U-shaped member, and said U-shaped member having a pair of spaced apart parallel legs with the free ends thereof connected to one of said loops in substantial alignment with both of said loops and said ferrule.

2. The combination according to claim 1, wherein said abutment comprises a spherical member slidably carried upon said legs of said inverted U-shaped hanger for selective longitudinal movement with respect to said ferrule.

3. The combination according to claim 2, wherein said spherical member comprises a resilient and compressible ball.

References Cited in the file of this patent
UNITED STATES PATENTS

| | | |
|---|---|---|
| 1,290,433 | Walker | Jan. 7, 1919 |
| 2,815,909 | Paprocki | Dec. 10, 1957 |

FOREIGN PATENTS

| | | |
|---|---|---|
| 1,443 | Great Britain | Jan. 22, 1895 |